No. 772,640. PATENTED OCT. 18, 1904.
W. W. BENSON.
PACKING FOR PISTON RODS.
APPLICATION FILED FEB. 23, 1904.

NO MODEL. 2 SHEETS—SHEET 1.

WITNESSES:
INVENTOR
W. W. Benson
BY
Charles N. Butler
ATTORNEY.

No. 772,640. Patented October 18, 1904.

UNITED STATES PATENT OFFICE.

WILLIAM W. BENSON, OF PHILADELPHIA, PENNSYLVANIA.

PACKING FOR PISTON-RODS.

SPECIFICATION forming part of Letters Patent No. 772,640, dated October 18, 1904.

Application filed February 23, 1904. Serial No. 194,979. (No model.)

*To all whom it may concern:*

Be it known that I, WILLIAM W. BENSON, a citizen of the United States, residing at Philadelphia, in the county of Philadelphia and State of Pennsylvania, have invented certain Improvements in Packing for Pistons, Piston-Rods, and the Like, of which the following is a specification.

This invention has as its primary object to provide an improved metallic packing having means compensating for wear and maintaining efficiency. It provides an easy and flexible action while maintaining a close packing.

The nature and characteristic features of the improvements will more fully appear by reference to the following description and the accompanying drawings in illustration thereof, of which—

Figure 2:
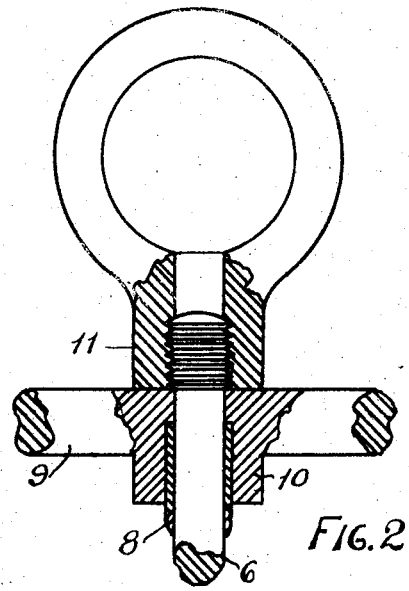
Figure 1:
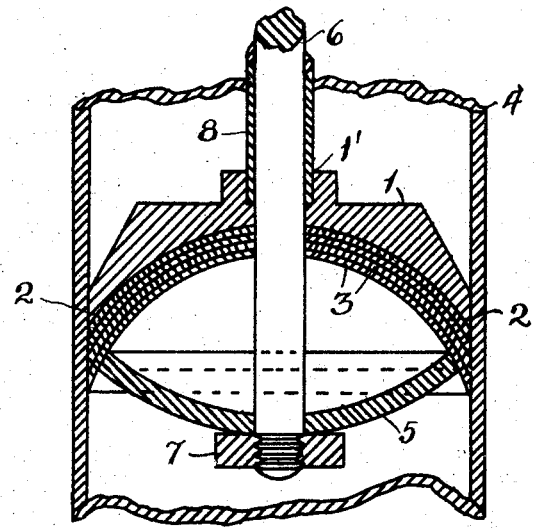
Figure 4:
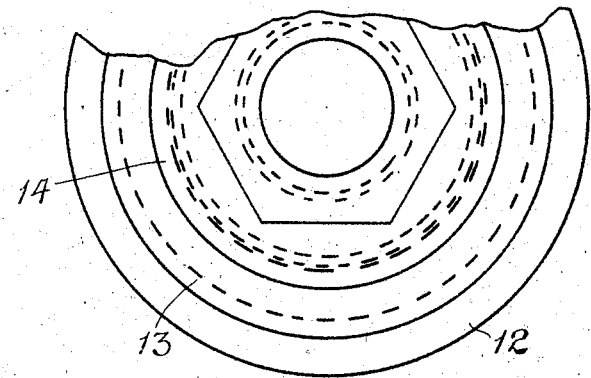
Figure 3:
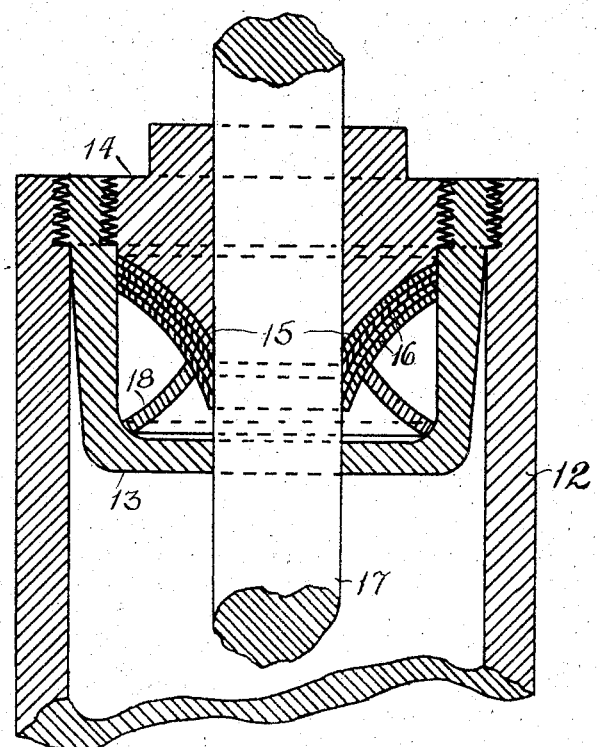

Figure 1 represents a sectional view of a piston-packing embodying my invention. Fig. 2 represents a sectional elevation of a connection for supporting the piston shown in Fig. 1. Fig. 3 represents a sectional view of a rod-packing made according to my invention, and Fig. 4 is a partial top plan view of the construction shown in Fig. 3.

Referring to Fig. 1, the piston 1 has therein the spherical seat 2, which receives the spherical segments or packing-shells 3, suitably of Babbitt metal, the shells being held together on their seat and pressed against the cylinder 4 by the spherical segment or pressure-shell 5. These parts are clamped together by the piston-rod 6, which passes through the several parts of the piston and has the nut 7 on its end and a collar or sleeve 8, which is seated in the socket 1'.

As shown in Fig. 2, a frame or head 9 has the sleeve 8 seated in a socket 10 thereof, through which the rod 6 passes to have its head engaged by the nut 11, by which the several parts of the piston are fixed together.

It will be seen that the parts of the laminated shells held together and against the cylinder have a brush-like construction and action, forming a close and flexible packing, whose relation to the cylinder is maintained notwithstanding wear by reason of the action of the pressure-shell, which tends to straighten out the edges of the packing-segments while thrusting them against the cylinder.

Referring to Figs. 3 and 4, the cylinder 12 has the cup 13 screwed in the end thereof, and a head 14 is screwed into the cup. The head is provided with a concavo-conical seat 15, which supports the conforming shells 16 of Babbitt metal or like material. These shells are pressed together and against the piston-rod 17, which passes through the several parts, by a conoidal strut 18, supported in the cup, the head 14 being screwed up to provide the necessary pressure. By this construction and action the laminated packing-shells are held in packing relation to the rod, forming a flexible and close joint, which is constantly maintained notwithstanding wear.

Having described my invention, I claim—

1. In a packing, a concave seat, a packing-shell supported thereby, and a strut holding said shell on its seat and acting to straighten said shell, substantially as specified.

2. In a packing, a bearing-surface, a concave seat, a packing-shell conforming to and supported by said seat, and a strut holding said shell on its seat and pressing it against said bearing-surface, substantially as specified.

3. In a packing, a bearing-surface, a concave seat, a plurality of laminated packing-shells resting on said seat and having edges bearing against said surface, and a pressure-shell for holding said packing-shells together and pressing said edges against said surface, substantially as specified.

4. In a packing, a concave seat, laminated packing-shells resting upon said seat, a concave pressure-shell bearing against said laminated shells, and means for drawing said seat and pressure-shell together, substantially as specified.

In testimony whereof I have hereunto set my hand, this 18th day of February, 1904, in the presence of the subscribing witnesses.

WM. W. BENSON.

In presence of—
UTLEY E. CRANE, Jr.,
R. J. SNYDER.